May 6, 1952  R. R. LOVE  2,596,035
DUAL OFFSET WHEEL MOUNTING FOR VEHICLES
Filed Aug. 4, 1948  2 SHEETS—SHEET 1
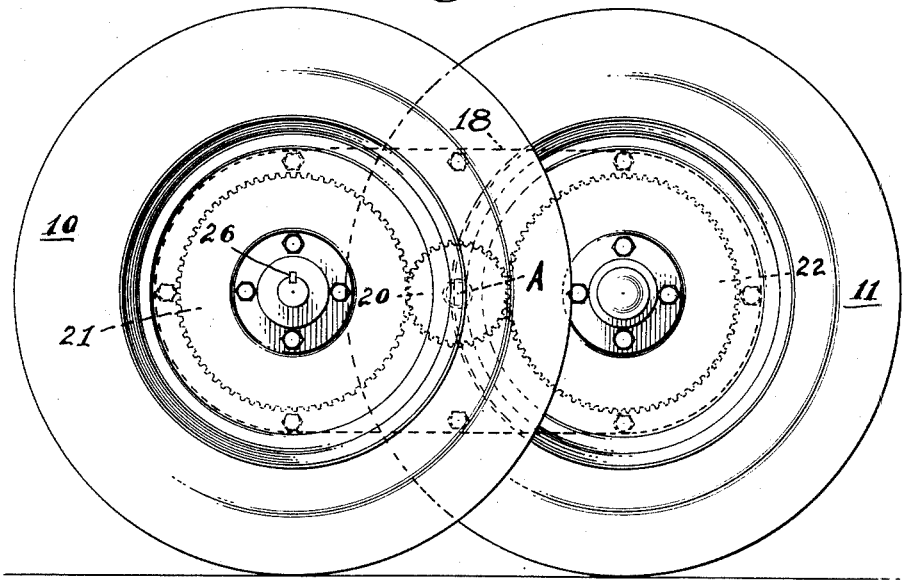
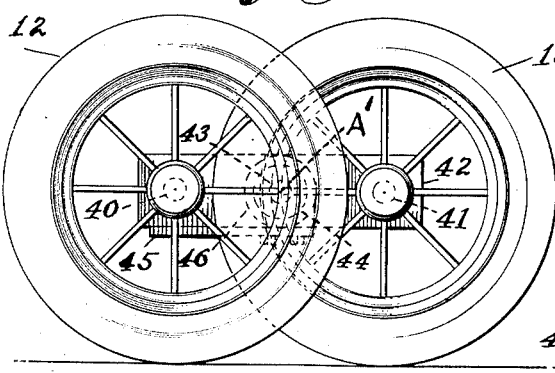
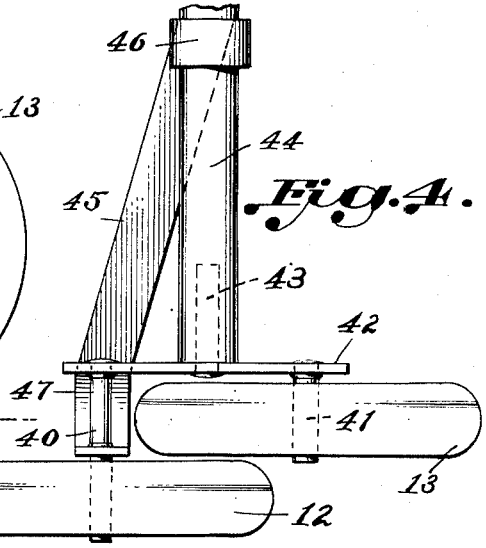

Patented May 6, 1952

2,596,035

UNITED STATES PATENT OFFICE 2,596,035

DUAL OFFSET WHEEL MOUNTING FOR VEHICLES

Richard R. Love, Buhl, Idaho

Application August 4, 1948, Serial No. 42,511

3 Claims. (Cl. 180—22)

My present invention has for its object to provide improved wheel mountings for vehicles in which a dual arrangement of offset wheels is employed, these being coupled in overlapping position on a common rocking member, whereby there will be an automatic compensation for irregularities in the ground surface traversed by the vehicle, thus insuring its smooth riding qualities.

Another object of my invention is to provide an improved mounting for the driving wheels of a motor vehicle comprising pairs of dual offset and overlapping wheels to each of which power is applied, said pairs of wheels being mounted for a limited oscillating or rocking movement which when the vehicle traverses uneven ground surfaces allows the wheels carrying the load to conform to said surface without necessarily displacing the vehicle vertically in accordance with irregularities in the terrain.

My invention further comprehends the mounting of a pair of wheels in a closely coupled overlapped arrangement especially adaptable to agricultural vehicles which will reduce the vibration in travelling over the uneven surfaces of a field without interfering with the turning of the vehicle especially in soft or muddy ground.

To these and other ends my invention comprises further improvements and advantages as will be further described in the accompanying specification, the novel features thereof being set forth in the appended claims.

In the drawings:

Figure 1 is a side elevation showing a pair of vehicle wheels, as driving wheels, in a close coupled arrangement in accordance with my invention.

Figure 3 is a view similar to Fig. 1 showing a pair of offset wheels in close coupled arrangement as used on a drawn vehicle or trailer.

Figure 4 is a top plan view of the pair of wheels illustrated in Fig. 3, and

Figure 5 is an end elevational view thereof.

Similar reference numerals, in the several figures, indicate similar parts.

Figure 2:
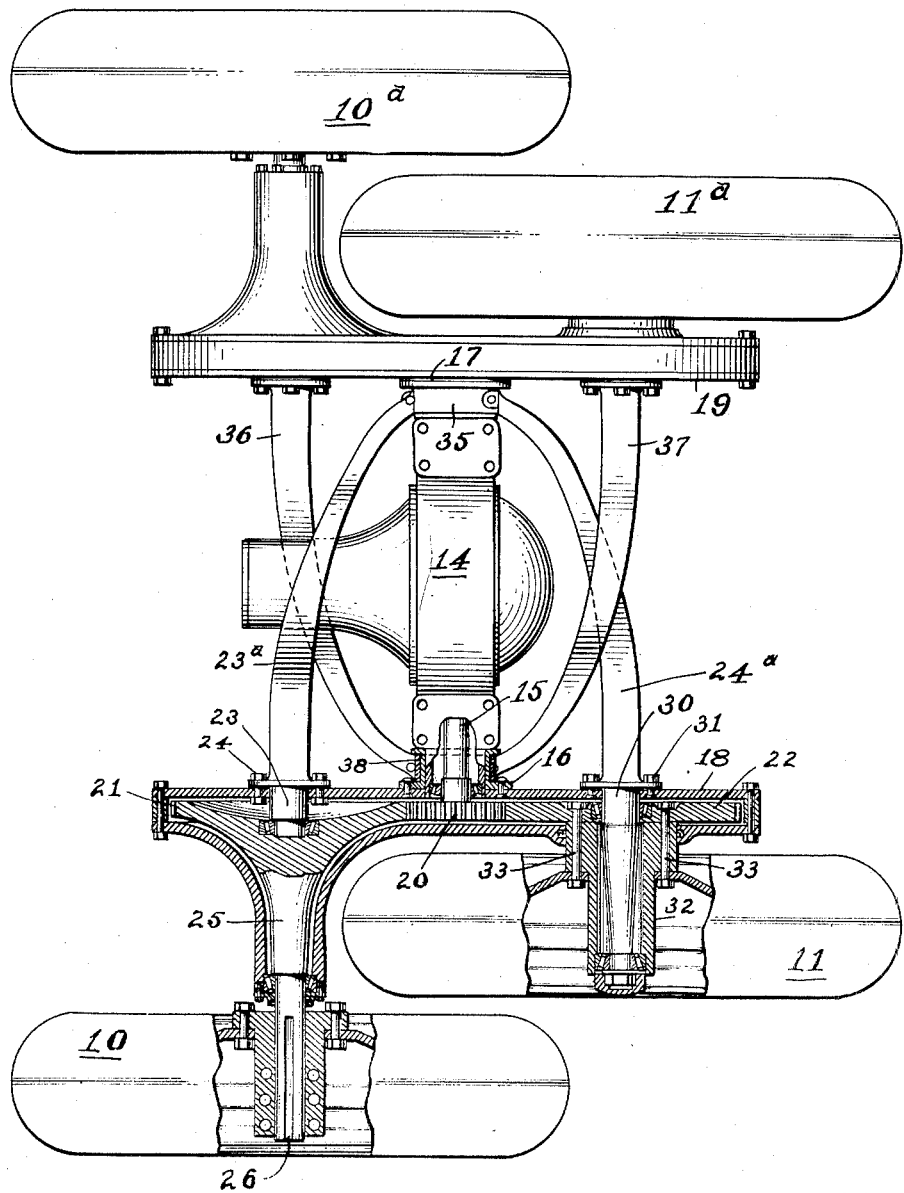
Figure 2 is a top plan view of the rear portion of a vehicle chassis, showing a rear axle differential and the right and left hand pairs of wheels driven thereby.

While my invention is applicable to all forms of vehicles whether these are intended for travel on the usual hard surfaced highways or over unplowed surfaces the arrangement I have perfected for the wheel mounting is specially adapted for the mounting of vehicles employed in agricultural operations. In these cases the machines are more often than otherwise either driven over or pulled across plowed areas or across irrigated fields and the earth is both soft and uneven. The unevenness of the surface imparts a violent vibration to a vehicle which in accordance with my invention I am able to greatly lessen and at the same time provide a coupling for the wheel pairs which will permit a vehicle to be turned sharply in soft ground without ruining the surface corrugations. Also because of the close coupling of the wheels, very little skidding is necessary in turning.

Wheel mountings embodying my invention are also adapted for motor driven road graders and machines of a similar type in that it provides a simple gear drive through four wheel traction as compared to the usual double chain drive employed with a four wheel drive.

In addition to the foregoing my invention provides an arrangement of drive wheels which will not bounce or shimmy when driving a vehicle through soft sand and the like.

My invention contemplates broadly a pair of wheels, two sets of which may comprise the driving wheels of a motor driven vehicle, such as a tractor, or employed for carrying the weight of a trailer. Figure 1 shows a pair of driving wheels 10—11 and Figure 3 illustrates a pair of load carrying wheels 12—13 for use on a drawn vehicle, the feature of these illustrations being the manner in which the respective pairs of wheels oscillate about centers common to each, as indicated by A in Fig. 1 and $A^1$ in Fig. 3. In Fig. 2 the mounting of the drive wheels of Fig. 1 is shown and also the companion pair $10^a$—$11^a$ at the other side of the vehicle. The usual rear axle differential housing is indicated by 14, it being understood that power is delivered to the differential from the usual engine, or motor which is not shown. The outer ends of the driving axle parts, one of which is indicated by 15, are carried in journal boxes 16—17 which also carry horizontal rock arms 18—19. The latter are in the form of enclosed boxes each housing a central pinion 20, such as that on the end of axle 15, and two gear wheels 21—21 of equal size and pitch which mesh with said pinion and are connected respectively with their respective pairs of wheels 10—11 and $10^a$—$11^a$.

The wheels are of equal diameter. Wheel 10 is supported on an elongated axle 23 rigidly bolted at 24 to the rocker arm box-casing 18, said axle also forming the journal for gear wheel 21. The latter has an outwardly extending neck 25 carrying the wheel 10, said gear and wheel hub being locked together by a key 26. The mounting of wheel 11 which lies within and overlaps wheel 10 is slightly different. Here the hub of gear 22 is journaled on an axle 30, and rigidly connected to rock arm 19 by bolts 31 and connected to the wheel hub 32 by bolts 33.

At the inner end of the wheel axles 23 and 30 are arms $23^a$—$24^a$ which curve around the differential housing 14 and are connected at their ends to a collar 35 rotatable on the journal box 17 at the opposite end of housing 14. Similar arms 36—37 on the inner ends of the axles of wheels 10ª—11ª are connected to a collar 38 on the exterior of journal box 16.

It will be seen from this arrangement of the parts that the two pairs of drive wheels are free to rock about the driving axle independently while each wheel of each pair is driven synchronously through the intermeshing gears 20—21—22.

In Fig. 3 the pairs of wheels 12—13 are journaled on axles 40—41 carried on an arm 42 pivoted at its center on a stud 43 secured in the extremity of the vehicle axle 44. Inasmuch as one of the wheel axles, such as 40 is longer than the other, I provide as a support therefor an arm 45. The latter extends at an angle to axle 44 to which it is connected at its inner end by a collar 46 journaled on said axle. The arm at its outer end extends beneath the rock arm 42 to which it is rigidly connected, as by welding, from which point it projects as a bracket 47 to support the axle adjacent the inner face of the wheel.

The rocking arms 18—19 (Fig. 1) or 42 (Fig. 4), constitute compensators through which the vehicle chassis load is distributed to the wheels when one wheel of a pair drops into a declivity, such as an irrigation ditch, in most cases no difference in elevation is imparted to the chassis and in others where the successive depressions are of an irregular nature and exceptionally deep most of the chassis movement will be absorbed thus greatly lessening vibratory action in the frame of the vehicle and the parts carried thereby.

In both forms of wheel mountings herein disclosed I attain a close coupling effect of the wheels by journaling the rocker arms, or compensators, across the ends of the vehicle axle and locating the wheel axles thereon equi-distantly at opposite sides of the center of rotation of the arms. The wheel axles are of unequal length so that one wheel is mounted outwardly of the other. The diameter of the wheel on the shorter axis is determined by the distance between its axle and that of the other wheel so that it will rotate freely. Since it is desirable that both wheels be of the same diameter its size is regulated by the size of the first mentioned wheel thus bringing their overlapping portions as closely together as possible. This is of special importance in connection with farm implements as it enables the vehicles to turn sharply in either direction without cutting a swath in loose or broken ground. An advantage in the wheel construction herein outlined will be appreciated from the fact that vehicles thus equipped may be driven over irrigated fields without damaging the irrigating ditches.

I claim:

1. A close coupled dual wheel drive for vehicles comprising a differential and axle driven thereby having a driving pinion at each end of said axle, a housing for the differential and axle assembly, a cross arm journaled on each end of said housing, long and short wheel axles carried by each of said arms at opposite sides of the associated pinion, overlapping wheels journaled on said axles and each of said wheels provided with a gear wheel meshing with said pinion, a collar journaled on the housing adjacent each end of the vehicle axle, and a pair of arms rigidly connected to each collar and each pair of arms extending to the corresponding opposite end of the axle where the said arms are connected to the rocker arm connected to said opposite end of the axle in alignment with the respective wheel axles.

2. A close coupled dual wheel mounting for vehicles comprising a vehicle axle, a first rocker arm connected to and extending across one end of said vehicle axle, a second rocker arm extending across and connected to the other end of said vehicle axle, said rocker arms being rotatably mounted on said vehicle axle, a pair of wheel axles on each rocker arm disposed equi-distant from the center of rotation of each rocker arm, one of the wheel axles on each arm being longer than the other, wheels carried on each of said wheel axles, a first collar journaled on the vehicle axle adjacent said one end thereof, a second collar journaled on the vehicle axle adjacent said other end thereof, and a pair of arms connected to each of said rocker arms, each arm of each pair of arms being in alignment with a wheel axle at the point of attachment of each arm with a rocker arm, the pair of arms connected to the first rocker arm extending in the direction of the second rocker arm, and being connected to opposite sides of said second collar, the pair of arms connected to said second rocker arm extending in the direction of the first rocker arm and being connected to opposite sides of said first collar.

3. A close coupled dual wheel mounting for vehicles comprising a vehicle axle, a first rocker arm connected to and extending across one end of the vehicle axle and rotatably mounted thereon, a second rocker arm connected to and extending across the other end of said axle and rotatably mounted thereon, a pair of wheel axles on each rocker arm disposed equi-distant from the center of rotation of each rocker arm, wheels of equal diameter mounted on the wheel axles of each arm in overlapping relation, a first collar journaled on the vehicle axle adjacent said one end thereof, a second collar journaled on the vehicle axle adjacent said other end thereof, and a pair of arms connected to each collar, the pair of arms connected to said first collar extending toward said second rocker arm where the said arms are connected to said second rocker arm in alignment with the axles of the wheels on said second rocker arm, the pair of arms connected to said second collar extending toward the said first rocker arm and being connected to said first rocker arm in alignment with the axles of the wheels on said first rocker arm.

RICHARD R. LOVE.

REFERENCES CITED

The following references are of record in the file of this patent:

UNITED STATES PATENTS

| Number | Name | Date |
|---|---|---|
| 302,370 | Wood | July 22, 1884 |
| 907,847 | Molesworth et al. | Dec. 29, 1908 |
| 1,707,535 | North | Apr. 2, 1929 |
| 2,056,371 | Schultz | Oct. 6, 1936 |
| 2,347,987 | Brumbaugh | May 2, 1944 |
| 2,445,686 | Nabors | July 20, 1948 |

FOREIGN PATENTS

| Number | Country | Date |
|---|---|---|
| 306,860 | Great Britain | Feb. 22, 1929 |
| 463,235 | Great Britain | Mar. 24, 1937 |
| 634,213 | France | Nov. 8, 1927 |
| 658,204 | France | Jan. 22, 1929 |
| 723,989 | France | Jan. 23, 1932 |